United States Patent [19]
Yang

[11] Patent Number: 4,617,646
[45] Date of Patent: Oct. 14, 1986

[54] ELECTRIC FIELD GRADIENT EXCITED LIQUID CRYSTAL CELL HAVING BISTABILITY

[75] Inventor: Kei-Hsiung Yang, Somers, N.Y.

[73] Assignee: International Business Machines Corporation, Armonk, N.Y.

[21] Appl. No.: 626,161

[22] Filed: Jun. 29, 1984

[51] Int. Cl.$^4$ ............................................. G11C 13/04
[52] U.S. Cl. ...................................... 365/108; 350/333
[58] Field of Search ................. 365/108, 109; 350/330, 350/333

[56] References Cited

U.S. PATENT DOCUMENTS

| | | | |
|---|---|---|---|
| 3,703,331 | 11/1972 | Goldmacher et al. | 350/350 R |
| 3,967,253 | 6/1976 | Tsuruishi | 365/108 |
| 4,105,288 | 8/1978 | Geffeken et al. | 350/350 |
| 4,291,948 | 9/1981 | Crossland et al. | 350/340 |

OTHER PUBLICATIONS

R. A. Soref, "Field Effects in Nematic Liquid Crystals Obtained with Interdigital Electrodes", Journal of Applied Physics, vol. 45, No. 12, Dec. 1974, pp. 5466 to 5468.

*Primary Examiner*—Joseph A. Popek
*Attorney, Agent, or Firm*—Roy R. Schlemmer

[57] ABSTRACT

A liquid crystal storage device includes a smectic phase liquid crystalline medium in spaced relationship with at least three separated electrodes, the first of which provides a ground plane and is in contact with the liquid crystal medium; a second electrode, spaced from the first electrode, is arranged in a mesh-like or finger electrode configuration, being likewise in contact with the liquid crystal medium; a third electrode is spaced by a dielectric medium from the second electrode, such third electrode being in either orthogonal or parallel relationship with the second electrode. Voltages are selectively applied to each of the second and third electrodes such that the stable state of the liquid crystalline layer is changed from the ordered (homeotropic) or clear state, to the disordered (focal conic) or dark state.

11 Claims, 10 Drawing Figures

FAN TEXTURE

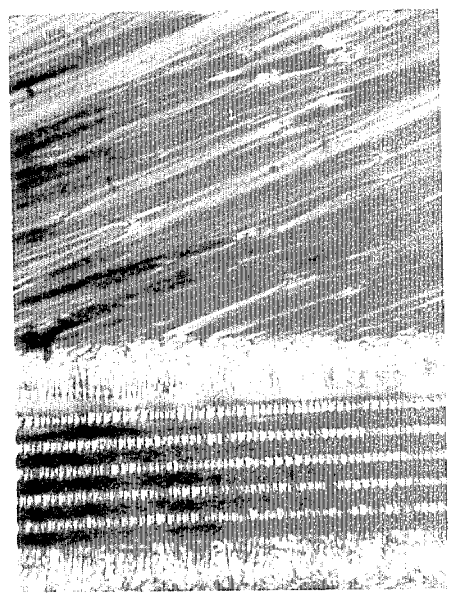
FIG.1(c)
FIG.1(d)
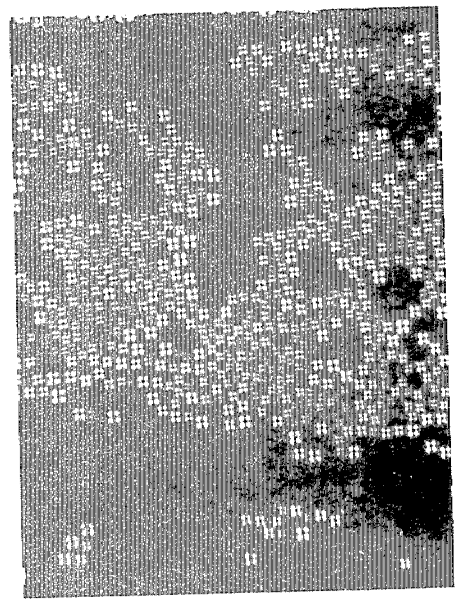

ELECTRIC FIELD GRADIENT EXCITED LIQUID CRYSTAL CELL HAVING BISTABILITY

BACKGROUND OF THE INVENTION

1. Field of the Invention

This invention relates to liquid crystal devices and more particularly, to a memory or storage cell embodying a liquid crystal medium.

2. Background Information

Great interest has focused during the past ten years or so on liquid crystal displays used in calculators, digital watches, small screen television sets and like equipment.

A variety of liquid crystal materials have been studied and these materials exhibit phases such as the nematic, the smectic, the cholesteric, as well as other phases. Within the phase classifications, a number of different molecular alignments can occur, depending on temperature, electric field and other parameters. One of these alignments is called homogeneous, which refers to an alignment that is parallel to the plates which are utilized in formation of the cell; whereas a homeotropic alignment occurs when the molecules are perpendicular to both of the plates. Yet another designation is the focal conic texture, which is characterized by a disordered or scattered orientation. Each of the foregoing, that is, the homogeneous, homeotropic or focal conic is referred to hereinafter as a state of the liquid crystal material and, hence, of the cell of which it forms a part.

As will be appreciated, by referring, for example, to U.S. Pat. No. 4,291,948, liquid crystal display cells that can provide a variety of color states and which can operate in a storage mode, can be formed of material that has positive or negative dielectric anisotropy. A smectic liquid crystal medium is discussed in that patent, such medium being disposed between electroded plates that are treated to produce parallel, that is, homogeneous alignment with a very large tilt angle. Variation of this tilt angle, as described in that patent, can be progressively increased by increasing the strength of an applied alternating potential, thereby producing Newtonian colors when viewed through crossed polarizers.

In accordance with one embodiment described in U.S. Pat. No. 4,291,948, a storage mode is achieved by variation of the aforenoted tilt angle. That is to say, when the tilt is increased from an initial value, it turns out that this increase is sustained after removal of the exciting field which caused it. However, as explained in the patent, the cell is switched back to the original lower limit of tilt angle by a heating and cooling cycle, whereby the material goes through its nematic phase and back to the smectic phase. In this connection, see FIG. 4 of this patent. Summarizing the operation of a typical cell as disclosed in U.S. Pat. No. 4,291,948, the cell is capable of being switched in only one direction by the application of an alternating electric potential, while thermal cycling is used for switching in the opposite direction. Moreover, as noted above, any storage that is achieved is based on variation of the tilt angle responsive to application of an exciting field. The only exception to this is the suggestion contained in column 4 of U.S. Pat. No. 4,291,948 to the effect that certain smectic phase materials have the property of exhibiting a cross-over frequency effect in which the material exhibits positive dielectric anisotropy at low frequencies below the crossover frequency and a negative dielectric anisotropy at high frequencies above the crossover frequency. The patentee further states that with such materials, electric switching in both directions is possible. However, except for this, any explicit teaching of bistability depends upon a heat treatment to change the stable state of the liquid crystal cell. In addition, such liquid crystal cell in U.S. Pat. No. 4,291,948 involves simply the application of a uniform field to the liquid crystal medium embedded between the two electrodes or plates of the cell.

Other references that also disclose the concept of storage in one form or another in a liquid crystal display are the following: U.S. Pat. Nos. 3,703,331 and 4,105,288. The former patent discloses a liquid crystal element which is constituted of a chiral nematic (or cholesteric) phase liquid crystal material. The latter patent refers to liquid crystal materials which demonstrate a quasi-bistability effect under certain boundary conditions. That is to say, when the applied electric field sees a certain threshold value, the material passes out of the energetically stable (focal conical) structure into a homeotropic-nematic orientation; and this orientation is maintained until the electric field is reduced below a second threshold value, with a brief formation of a planar-conical intermediate state.

Another reference of interest is an article by R. A. Soref entitled "Field Effects in the Nematic Liquid Crystals Obtained with Interdigital Electrodes", Journal of Applied Physics, Vol. 45, No. 12, December 1974. This article discloses certain interesting field effects in nematic liquid crystals. However, the device disclosed is provided with only two electrodes and does not provide permanent or stable state storage. In other words, refresh circuitry would have to be provided in order to renew the charge on any inherent or separate capacitance that might be involved with the basic device structure.

Whatever the advantages, and features of the aforenoted references, none of them discloses the features and advantages of the present invention.

Accordingly, it is a primary object of the present invention to provide a storage or memory device that is based upon the use of a liquid crystal material, preferably of the smectic phase, but depends on selective application of voltage pulses to discrete electrodes to effectuate stable states.

SUMMARY OF THE INVENTION

The above objects are fulfilled and implemented by a fundamental feature of the present invention according to which two stable states are provided for the cell by reason of incorporation of three electrodes within the cell structure, with connection of these three electrodes to distinct potentials. The first electrode functions as a ground plane, being connected to a constant ground potential. By appropriate selective application of potentials, for example, by time varied pulses supplied discretely to bit and word lines connected respectively to two of the electrodes formed adjacent the liquid crystal medium, the cell will develop two distinct electric field configurations responsive to the separate pulses. The first stable state of the cell which is generated responsive to the application of a pulse to the second electrode alone, while the third electrode is left floating, is defined as the scattered or focal conic state of the liquid crystal; the second stable state, which is generated responsive to the coincidence of the aforenoted pulse applied to the second electrode and a voltage pulse applied to the third electrode, is defined as the ordered or hemeotropic state of the liquid crystal material. The first state in the storage device as fabricated manifests itself as a dark condition, the second state as a clear or transparent condition. More specifically, the field configuration involved with the first state of the cell, is a non-uniform or "fringe" electric field; while the additional application of a voltage pulse to the third electrode results in a uniform field because of the configuration of the third electrode. The precise relationship among electrodes will be disclosed in detail hereinafter. It is sufficient to point out here that the second electrode is arranged in a mesh-like configuration. This configuration is similar to so-called inter-digitated electrode structures such as, for example, have been disclosed in the article by R. A. Soref cited herein above.

Other and further objects, advantages and features of the present invention will be understood by reference to the following specification in conjunction with the annexed drawing, wherein like parts have been given like numbers.

DESCRIPTION OF PREFERRED EMBODIMENT

Figure 3:
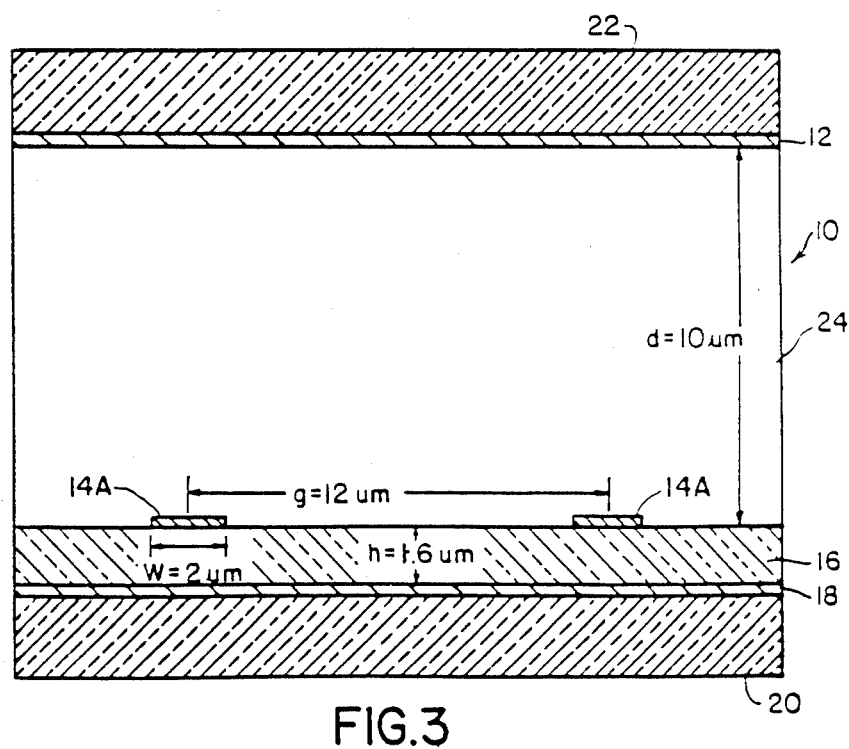
FIG. 3 illustrates the cell structure of a 3-terminal device serving as a typical unit or cell in an array of cells.

Referring now to the figures of the drawing and, first of all, to FIG. 3, there is illustrated the structure of a unitary cell that could constitute one of many cells in a storage array. This cell structure comprises a three-terminal device 10 in which three distinct electrodes are provided. The first of these electrodes is the top electrode 12 constituting a ground plane with respect to the entire cell structure. Such ground plane is, of course, connected to ground potential. A second electrode is in the form of a so-called mesh row electrode 14. By the term "mesh" is simply meant that the row electrode 14 as seen is formed in two thin spaced strips 14A of material, such as indium-tin oxide, the two strips being connected together to a common potential.

It will be noted that in the cell structure of the present invention, a dielectric layer 16 is interposed between the second electrode, that is, the mesh or row electrode 14 and a third electrode, designated a column electrode 18, which is likewise formed of indium-tin oxide or the like. This dielectric layer 16 is selected to have a thickness of approximately 1.6 micrometers and with a dielectric constant of approximately 4.5. A dielectric material such as $SiO_2$ is useful.

It will be understood that the row electrode 14 and dielectric layer 16, as well as column electrode 18, are formed in successive layers on a glass plate 20 in accordance with well known fabrication techniques. Likewise, the top electrode 12 is fabricated on a corresponding glass plate 22.

Further in accordance with known procedures, the space between the top electrode 12 and the bottom of the cell structure is completely filled with a liquid crystal medium 24. A liquid crystal material that has been selected in accordance with studies that have been conducted and samples that have been fabricated, is a material known as $S_2$, consisting essentially of 50% by weight of 4-cyano-4'-n-octylbiphenyl, 39% by weight of 4-cyano-4'-n-decylbiphenyl and 11% by weight of 4-cyano-4'-n-undecylbiphenyl. This particular material is a smectic A phase material from $-10°$ to $48°$ C. Either pure $S_2$, or $S_2$ with 1% of heptyloxy benzoic acid as an impurity, can be used.

The fundamental capability of the device 10 as seen in FIG. 3, for operating in different stable states, resides in the fact that by supplying appropriate potentials to the three electrodes therein shown, the state of the device can be changed back and forth between the ordered or hemeotropic state of the liquid crystal smectic phase material and the scattered or focal conic state of such material. Thus, it is important to note that no heating of the liquid crystal material to change its phase is required. Instead, only appropriate application of different potentials to the three electrodes is necessary and sufficient. The reason for this capability is because of the different electric fields that are applied to the liquid crystal material; specifically, a fringe field, or non-uniform field, is selectively applied by appropriate selection of voltage pulses supplied to the separate electrodes; also, a uniform field is applied at appropriate times.

Figure 1A:
FIG. 1 is a group of four figures, 1A, 1B, 1C, and 1D, which illustrate the different molecular alignments or states obtained in accordance with the present invention.

In order to substantiate the reason advanced above for the bistability of the device of the present invention, reference will now be made to results achieved by the inventor in studies that were conducted on the non-uniform field excited focal conic (FC) texture in smectic phase liquid crystal medium for display applications. As already noted in connection with FIG. 3, the liquid crystal medium was sandwiched between two indium-tin oxide coated electrodes fabricated upon glass substrates or plates. The so-called row electrode was patterned into the two co-planar interposed strips or fingers. The smectic phase liquid crystal material was, as noted previously, $S_2$ (from British drug house); and was used with and without 1% heptyloxy benzoic acid for the investigation. An $SiO_x$ layer of approximately 500 angstroms was obliquely evaporated on the interposed finger electrode to align the liquid crystal medium. Polaroid pictures of the liquid crystal medium were taken with magnification of 400 using a Reichert microscope with crossed polarizers. The medium was filled into the cell in the isotropic state. After it was cooled down to room temperature, the smectic crystal medium was in the fan texture as shown in FIG. 1A.

Figure 1B:

In a specially constructed two terminal device, with pure $S_2$, a 100 millisecond voltage pulse with to 500 volts (13 micrometer cell) was used to excite the liquid crystal medium. The sample was thermally biased at $41 \pm 1°$ C. When the amplitude of the voltage pulse exceeded about 65 volts, the liquid crystal medium was aligned into the homeotropic state from the fan texture. The upper half of FIG. 1B shows the background fan texture corresponding to no-field region, while the lower half of FIG. 1B shows the field-aligned homeotropic state. Both of these regions are transparent to the naked eye. The transition region between the fan texture and the homeotropic state shows strong light scattering, which is an indication of the focal conic texture. The focal conic texture was excited near the edge of the row electrode where the gradient of electric field exists (see FIG. 6).

The mechanism for the occurrence of this FC texture can be explained as follows: unlike the nematic phase liquid crystal material, the smectic phase liquid crystal material situated at the fringe field region (again see FIG. 6) cannot bend itself to match the variation in the electric field as a function of space. Accordingly, the minimization of free energy associated with this sum of elastic energy and field energy favors the occurrence of the FC texture.

Figure 2:
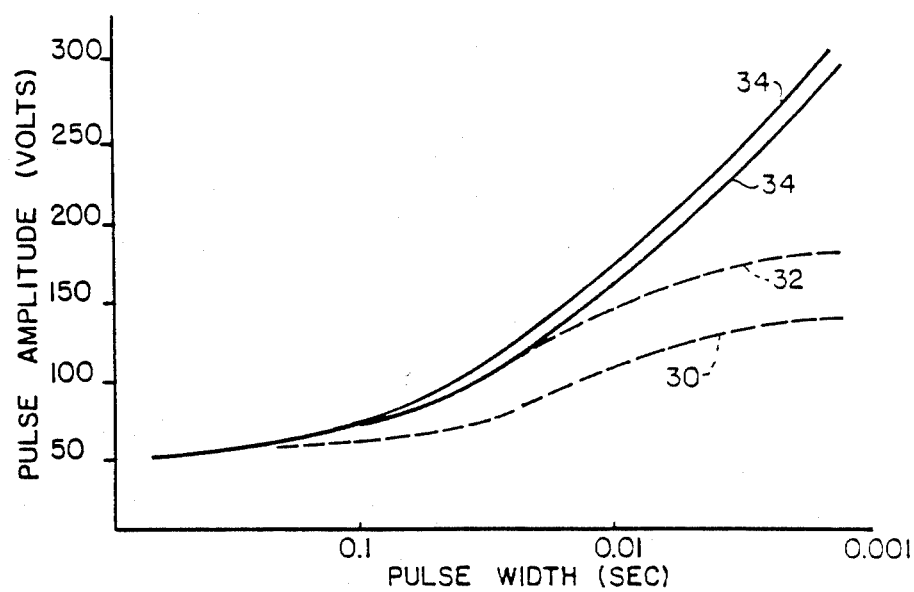
FIG. 2 is a graph of the relationship between pulse amplitude and pulse width in several studies that were conducted with a liquid crystal medium.

When the amplitude of the applied voltage pulse was increased to beyond 300 volts, the Maltese-cross structure of the FC texture started to develop slowly, after the voltage pulse application, becoming visible under the microscope. The density of the FC texture near the edge of the electrode increased and became slightly thicker the larger the amplitude of the pulse. When the same voltage pulse was applied to a sample biased at 46° C., the Maltese-cross structure of FC texture developed into a larger size and became more visible as indicated in FIG. 1D, which appeared slightly light-scattering under the naked eye. The FC texture generated near the edge of the electrode scattered light much more than the Maltese-cross generated by the uniform field. Further evidence of the FC texture generated by the field gradient rather than the uniform field is indicated in FIG. 1C. That picture was taken under the condition that the top electrode of the three terminal device, such as the one appearing in FIG. 3, was grounded, and a voltage pulse with amplitude of 70 volts and pulse width of 85 milliseconds was applied to the co-planar interposed fingers 14A of the row electrode 14 seen in FIG. 3. The experimental results of the threshold amplitude versus pulse width to align the liquid crystal medium ($S_2+1\%$ heptyloxy benzoic acid) in a two-terminal device from the fan texture to the homeotropic state is shown in FIG. 2 as the lower dashed curve 30. The complete alignment is shown as upper dashed curve 32.

Similarly, the threshold amplitude versus pulse width for the generation of the FC texture by the fringe field (or field gradient) is shown in FIG. 2 as the solid curves 34. The area enclosed by the solid curves represents the uncertainty of the measurement. It is clear from FIG. 2 that voltage pulses as short as one millisecond can be used to excite the FC texture by the field gradient. The writing speed for a display panel-implemented by using an array of devices such as a device 10 in FIG. 3, can be fast; however, the power dissipation is quite low because the scattering FC texture is mainly generated by the gradient of the electric field.

Returning now to further description of the device 10 of FIG. 3, and to panels or arrays incorporating many such devices, it will be appreciated that the results of the previously described experiments lead to the precise cell structure seen therein. This device 10 utilizes FC texture generated by the field gradient for a display application. As noted previously, the liquid crystal medium 24 is between a continuous conductive electrode (top electrode 12 used as a ground plane) and meshed row electrode 14, fabricated in the form of interposed strips 14A connected to a common potential. The spaced parallel strips of the common electrodes 18, for example, in a typical array, are separated vertically from the meshed row electrode 14 by a dielectric layer 16, which can, for example, be $SiO_2$.

In an exemplary construction, the thickness of the liquid crystal medium 24, as already specified, can be approximately 10 micrometers, the dielectric layer 16 approximately 1.6 micrometers, and the spacing between the fingers 14A of row electrode 14, approximately 12 micrometers.

Figure 5:
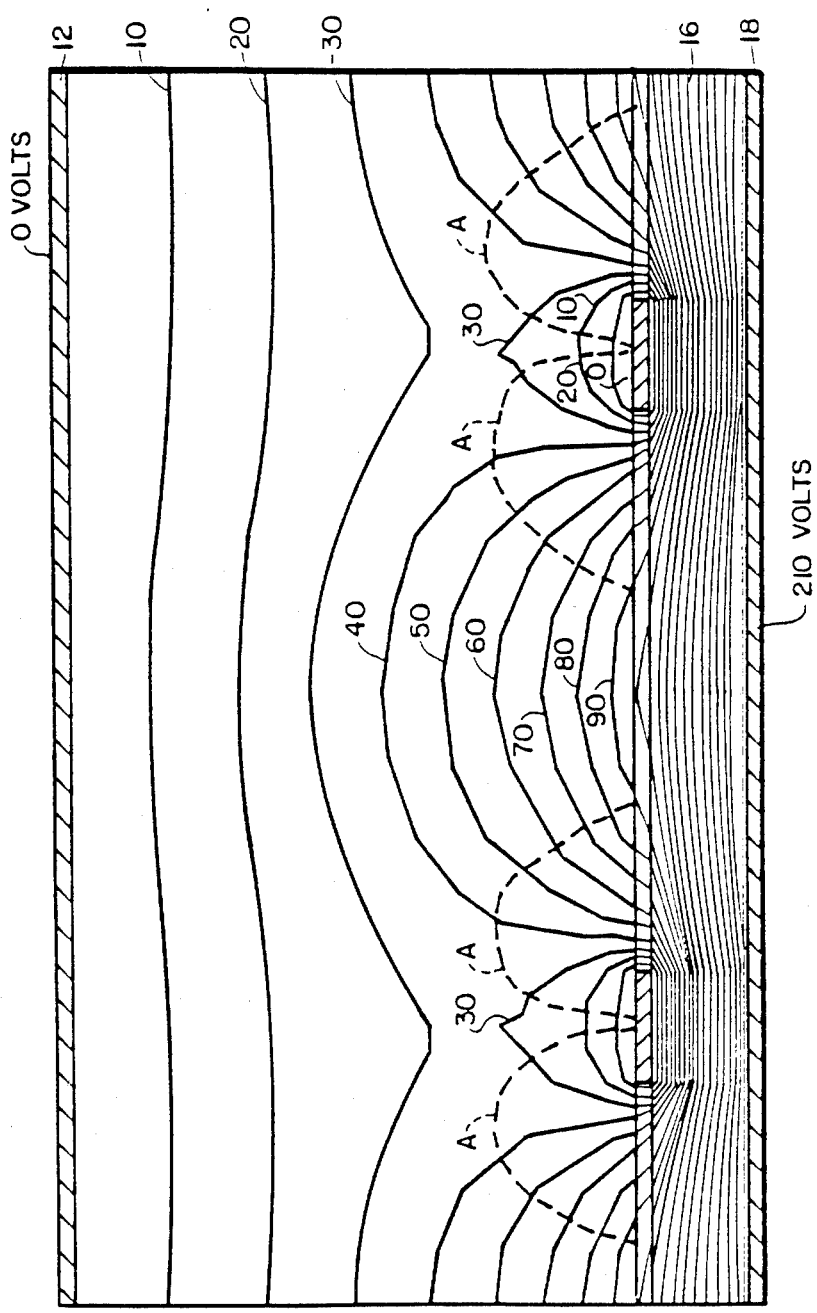
FIG. 5 illustrates the case where the column electrode is at 210 volts and the mesh or row row electrode is grounded.
Figure 6:
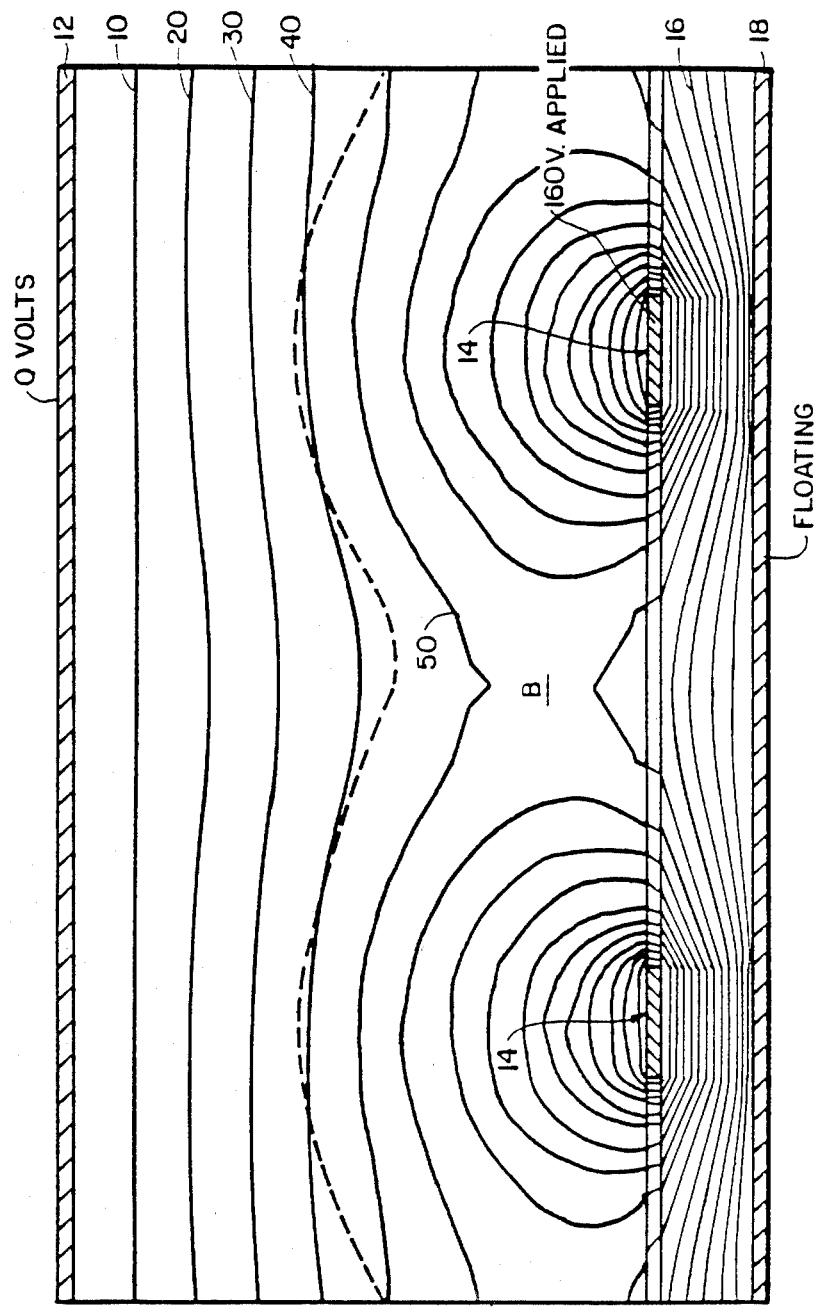
FIG. 6 illustrates the case where the mesh or row row electrode is at 160 volts and the column electrode is grounded.

In operation of a typical array formed of the devices 10 suitably connected to word and bit lines of conventional construction, a voltage pulse will strobe the meshed row electrodes 14 in a line-at-a-time fashion. It will be understood that an electrode 14 would be included in each cell in a given row; and that additional row electrodes 14 would be formed for all the other cells in the array. In the presence of 160 volts applied to row electrodes, but in the absence of voltage pulses (floating condition) applied to the column electrodes, which likewise are suitably provided in strips at predetermined locations in the columns of the array, there will result along the strobed row, a scattering FC texture in each of the individual cells of that row, due to the fringe field which occurs adjacent the meshed row electrodes (FIG. 6). This scattering FC texture will constitute the dark state all along the entire row. This first state will remain, even though the voltage pulse is no longer being applied to the row electrodes. However, these row electrodes will continue to be held at ground potential (FIG. 5).

Figure 4:
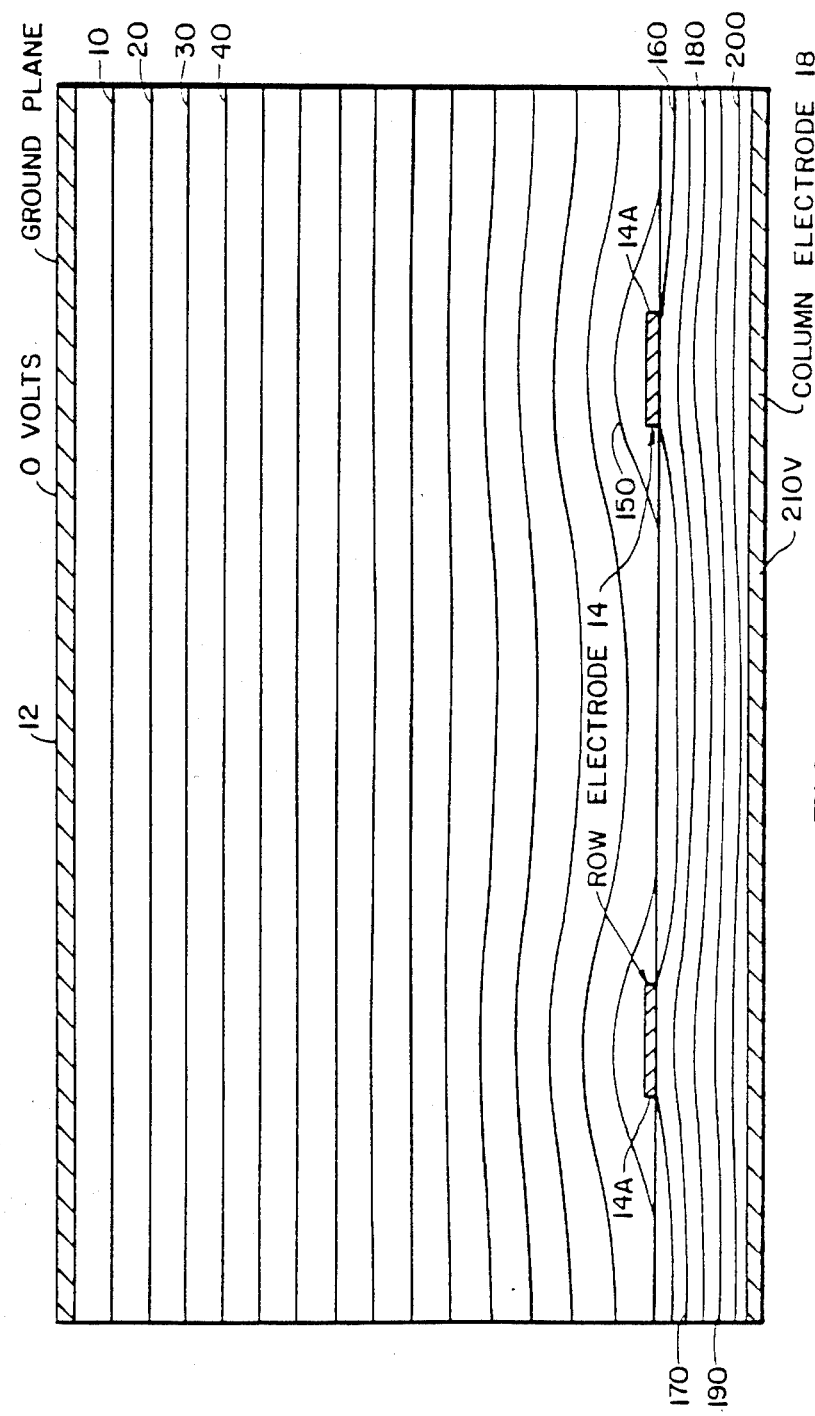
FIG. 4 illustrates the equal potential electric field contours when the potentials of a mesh or row row electrode and a column electrode are at 160 volts and 210 volts respectively.

Now let it be assumed that on the other hand, a certain picture element along that row has to be in a clear state, rather than in a dark state; for example, that a certain cell at a particular row and column location has to be in such clear state. In such case, a voltage pulse of 210 volts, synchronized with and having the same pulse width as the strobing pulse applied to the particular row, is applied to the corresponding column electrode (FIG. 4). The amplitude of the column voltage pulse will be approximately equal to $$V_0(e_2d+e_1h)/de_2$$

where $V_0$ is the amplitude of the strobing pulse, $e_1$ and $e_2$ are the dielectric permitivities of the liquid crystal medium 24 and the dielectric layer 16 and h is the thickness of the dielectric layer 16, respectively. In this way, the total field in the liquid crystal medium is quite uniform, thereby to align the LC medium present at that particular cell into the clear (homeotropic) state (see FIG. 4). This second state is likewise a stable state (using smectic A phase crystals).

After the strobing pulse has ended, this clear state will turn into a slightly scattering state when the column voltage pulse is repeatedly applied to that column electrode. The electric field generated by the column voltage pulse on the clear state is screened by the mesh row electrodes. The degree of screening can be determined from the detailed dimensions of d, h, g and w as seen in FIG. 3.

It will be appreciated by those skilled in the art, that the contrast ratio of the display device or of an array embodying such individual devices, can be optimized by adjusting the foregoing parameters. The meshed row electrodes 14 can be replaced by any foraminated electrodes.

In order that the most complete understanding of the present invention may be gained from the disclosure, equal potential contours have been calculated. These are based on the electrode configuration seen in FIG. 3, with the dimensions already specified. For this calculation, the thickness of each of the conducting electrodes (that is, the ground plane or first electrode 12, the meshed row or second electrode 14, and the column or third electrode 18) is 2200 Angstroms.

FIG. 4 shows the equal potential contours when the potentials of the meshed row electrode 14 and the column electrode 18 are at 160 volts and 210 volts respectively.

FIG. 5 shows the case where the column electrode 18 is at 210 volts and the meshed row electrode 14 is grounded. Using this FIG. 5, a rough estimate of the electric field line reveals that the focal conic texture will be generated near the edge of the meshed row electrode, as depicted by the dashed curve double loops A seen in that figure.

FIG. 6 illustrates the case where the meshed row electrode is at 160 volts and the column electrode is floating. The region where the focal conic texture is likely to form by reason of the field gradients is indicated as the region B between the dashed line shown in FIG. 6 and the dielectric layer 16.

Since FIGS. 4 and 6 represent the clear and dark states respectively of the liquid crystal layer 24; the estimated achievable contrast ratio of the device is approximately 3 to 1.

An alternate implementation of the device so as to improve the contrast ratio can be accomplished by changing the top ground plane of FIG. 3, into a sectionalized row electrode having multiple strips in parallel alignment with the respective strips of the meshed row electrode. With this construction, doing line-at-a-time multiplex addressing, the strobed meshed row electrode 14 is at a high voltage, while the corresponding strobed, aligned top row electrode 12 is grounded. In this case, the equi-potential contours are similar to those shown in FIG. 6. For non-strobed rows, both the meshed row electrode 14 and the top row electrode 12 are floating so that column voltage pulses applied on the column electrodes 18 can hardly affect the liquid crystal medium situated at the position of the non-strobed rows. The clear state is shown in FIG. 4.

Figure 7:
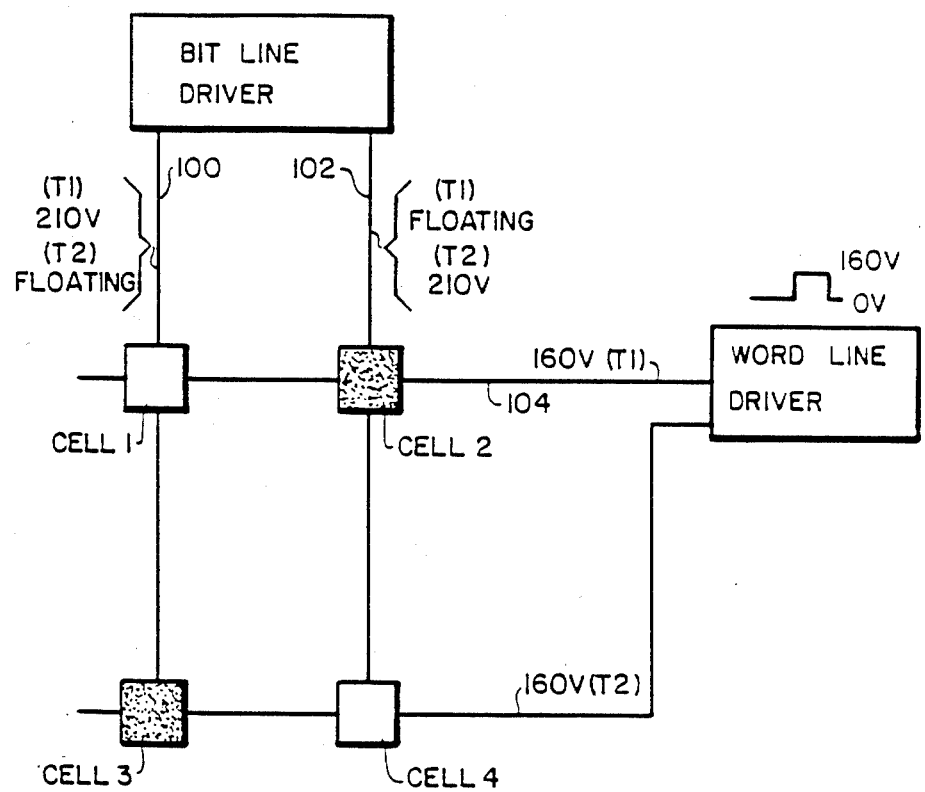
FIG. 7 illustrates schematically a simplified matrix of cells incorporating the bistable characteristics of the liquid crystal device of FIG. 3.

Referring now to FIG. 7, a simplified array of cells embodying the devices 10, previously seen in FIG. 3, is illustrated. This is an exemplary 2×2 array in which four cells are connected in a conventional coordinate arrangement. Thus a bit line driver is connected to the lines 100 and 102 and thence to the column electrodes 18 of the individual cells in the respective columns. A word line driver is selectively connected to the lines 104 and 106 which, in turn, connect to the row electrodes 14 of the cells in the respective rows.

In operation of the array of FIG. 7, the pulse output from the word line driver, having a value of 160 volts, is applied selectively to the word lines 104 and 106 at the respective times T1 and T2. At other times, zero volts is applied to each of the lines 104 and 106. Accordingly, when 210 volts is simultaneously applied at the time T1 to the bit line 100, then cell 1 will be placed in the second or clear state for the reasons already explained. On the other hand, if at the same time T1, a floating potential is applied to the bit line 102 and thereby to the column electrode 18 of cell 2 then, for reasons already explained, cell 2 is in the first or dark state.

It will be understood that at time T2, when a pulse of 160 volts is applied to word line 106, a totally opposite result will be produced in the cells 3 and 4, when compared with cells 1 and 2, because at time T2 the bit line 100 is at a floating potential, while the bit line 102 is at 210 volts, whereby the cell 3 is in the dark state and cell 4 in the clear state. It will be appreciated that only those cells in the row being strobed at a given time, will have their states affected since, without the presence of the 160 volt strobing pulse, an electric field sufficient to change the state of the liquid crystal material does not exist.

It will be evident to those skilled in the art that variations and modifications on the cell structure of FIG. 3 can be made. For example, instead of a three electrode structure, four electrodes can be provided; specifically, by adding an extra row electrode adjacent to the top of the liquid crystal layer 24 and by spacing the ground plane 12 from that additional row electrode by a further layer of dielectric material. It should be noted that the liquid crystal medium involved in the device cells can include dichroic dyes for color display purposes.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. A liquid crystal bistable storage device comprising:
   (a) a layer of liquid crystal material having at least two stable states, one of which is defined as an ordered state, the other as a disordered or scattered state;
   (b) at least three separated electrodes;
      (1) a first electrode of which provides a ground plane;
      (2) a second electrode in a mesh-like arrangement;
      (3) a third electrode in spaced relationship with said second electrode;
   (c) means for selectively applying varying potential levels to each of said second and third electrodes to produce distinct electric field configurations within said layer of liquid crystal material such that said stable states of said liquid crystal layer are changed from ordered to disordered.

2. A device as defined in claim 1, in which a non-uniform, or gradient, field is generated substantially within such liquid crystal layer to produce said disordered, or scattered, state for said layer.

3. A device as defined in claim 1, in which said liquid crytsal layer is disposed between said first and second electrodes; and a dielectric layer is disposed between said second and third electrodes.

4. A device as defined in claim 3, in which said liquid crystal layer has a thickness of from two to ten micrometers, and in which said dielectric layer has a thickness from a few thousand angstroms to several micrometers.

5. A device as defined in claim 1, in which said second electrode includes spaced strips connected to a common potential source; and said third electrode is formed as a strip connected to a common potential source.

6. A device as defined in claim 1 in which the liquid crystal material comprises by weight:
50% 4-cyano-4'-n-octylbiphenyl
39% 4-cyano-4'-n-decylbiphenyl
11% 4-cyano-4'-n-undecylbiphenyl.

7. A device as defined in claim 6, in which impurities such as 1% of heptyloxy benzoic acid is included in said layer.

8. A device as defined in claim 6, in which dichroic dyes are included in said liquid crystal layer.

9. A device as defined in claim 1, in which said liquid crystal layer is in the smectic phase, and the ordered state is the hemeotropic state, the disordered state corresponding with the focal conic texture for such material.

10. A device as defined in claim 1, in which said second electrode is composed of spaced strips, the width of a strip is approximately three micrometers, and the spacing between strips is approximately equal to the thickness of said liquid crystal layer.

11. An array of bistable storage cells, each of which comprises a device as defined in claim 1, and further comprising:
- a bit line driver for selectively applying potentials to bit lines connected to respective column electrodes of said cells;
- a word line driver connected to respective row electrodes for said cells;
- means for strobing selectively the rows in said array while simultaneously selectively applying potentials to corresponding columns in said array, whereby the individual stable states of each of the cells of the array can be changed by changing the state of the liquid crystal material in the device of said cells from the ordered to the disordered state, said ordered state being a clear state and said disordered state being a dark state.

* * * * *

UNITED STATES PATENT AND TRADEMARK OFFICE
CERTIFICATE OF CORRECTION

PATENT NO. : 4,617,646

DATED : October 14, 1986

INVENTOR(S) : Kei-Hsiung Yang

It is certified that error appears in the above-identified patent and that said Letters Patent is hereby corrected as shown below:

Column 4, line 64, after "with" insert -- amplitude up --.

Signed and Sealed this

Third Day of February, 1987

Attest:

DONALD J. QUIGG

Attesting Officer

Commissioner of Patents and Trademarks